Feb. 3, 1931.　　　J. K. MILLEN　　　1,791,063
VEGETATION CHOPPER
Filed Sept. 4, 1929　　2 Sheets-Sheet 1

J. K. Millen, INVENTOR
BY Victor J. Evans
ATTORNEY

Feb. 3, 1931.  J. K. MILLEN  1,791,063
VEGETATION CHOPPER
Filed Sept. 4, 1929   2 Sheets-Sheet 2
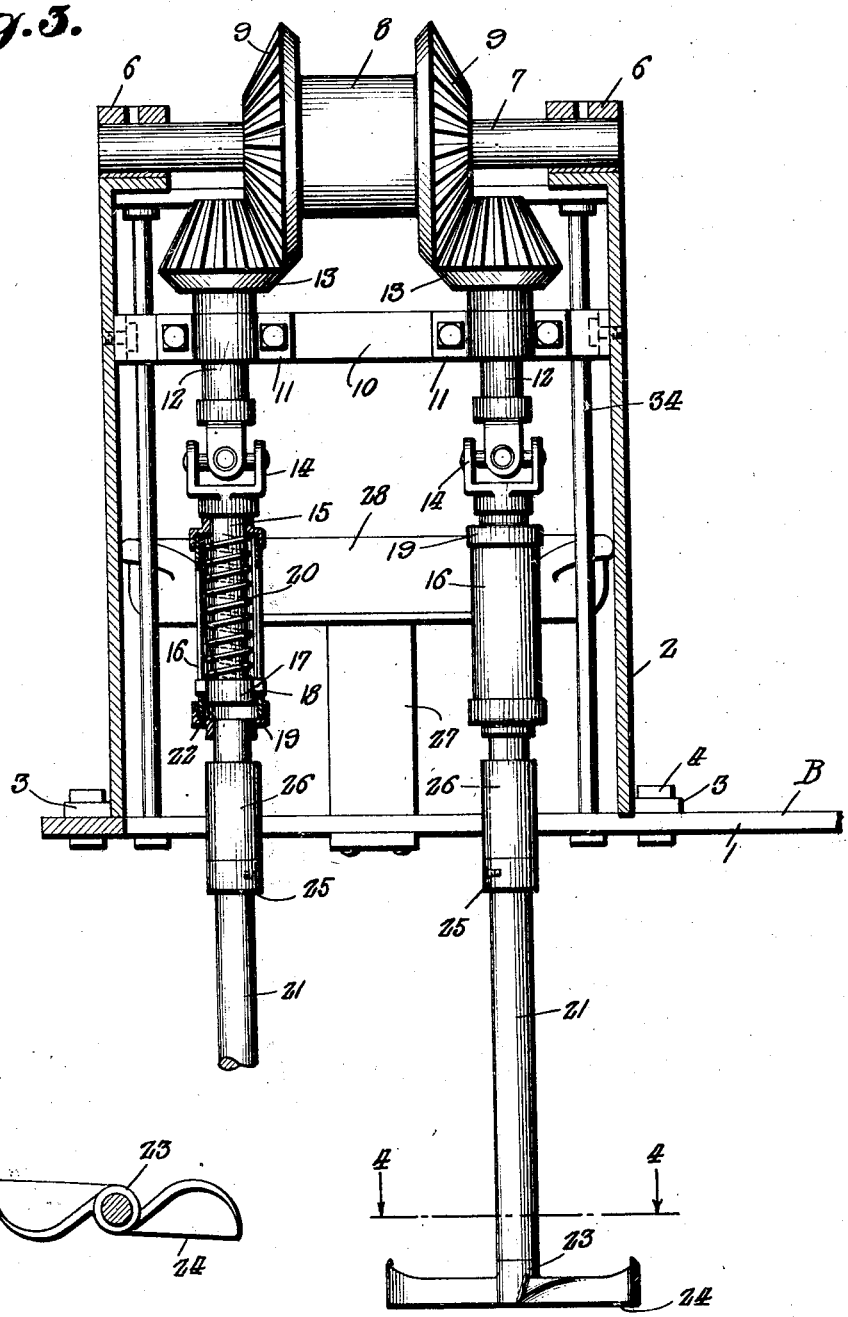

Patented Feb. 3, 1931

1,791,063

UNITED STATES PATENT OFFICE

JAMES K. MILLEN, OF LOMBARDY, MISSISSIPPI

VEGETATION CHOPPER

Application filed September 4, 1929. Serial No. 390,315.

This invention relates to agricultural implements, and its general object is to provide a chopper primarily designed for row crops, that is in the nature of hoes actuated by motive power means, but can be manually controlled in accordance with the operator's desire to chop and remove vegetation and the like in accordance with the growth thereof with respect to the rows.

A further object of the invention is to provide a vegetation chopper, weeder or the like, that is carried and operated by a tractor, which includes means for carrying the operators of the chopper or choppers as the case may be.

Another object of the invention is to provide a vegetation chopper including ground penetrating means that are capable of being manually controlled laterally, forwardly, rearwardly and vertically without retarding the rotative speed thereof.

A still further object of the invention is to provide a machine of the character set forth that is capable of weeding and chopping vegetation as well as to cultivate the soil in an easy and expeditious manner, with the result maximum acreage can be covered with minimum time and with minimum labor and workmen.

Another object of the invention is to provide a chopper that is simple in construction, inexpensive to manufacture and install, and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 3 is a sectional view taken approximately on line 3—3 of Figure 1, looking in the direction of the arrows.

Figure 4 is a sectional view taken approximately on line 4—4 of Figure 3, looking in the direction of the arrows.

Figure 1:
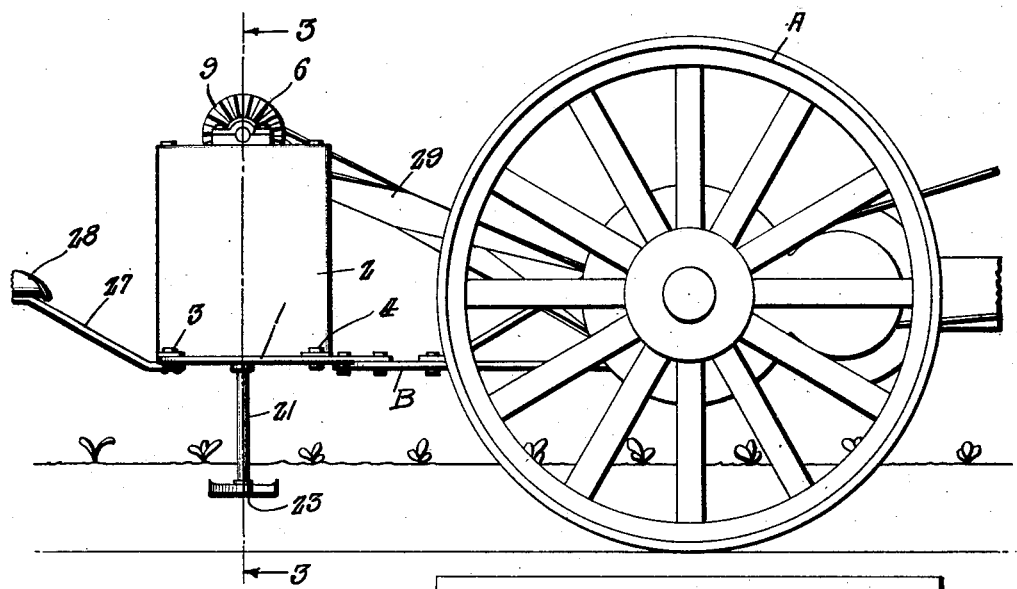
Figure 1 is a fragmentary side elevation illustrating my chopper applied to a tractor and with respect to a growing crop.
Figure 2:
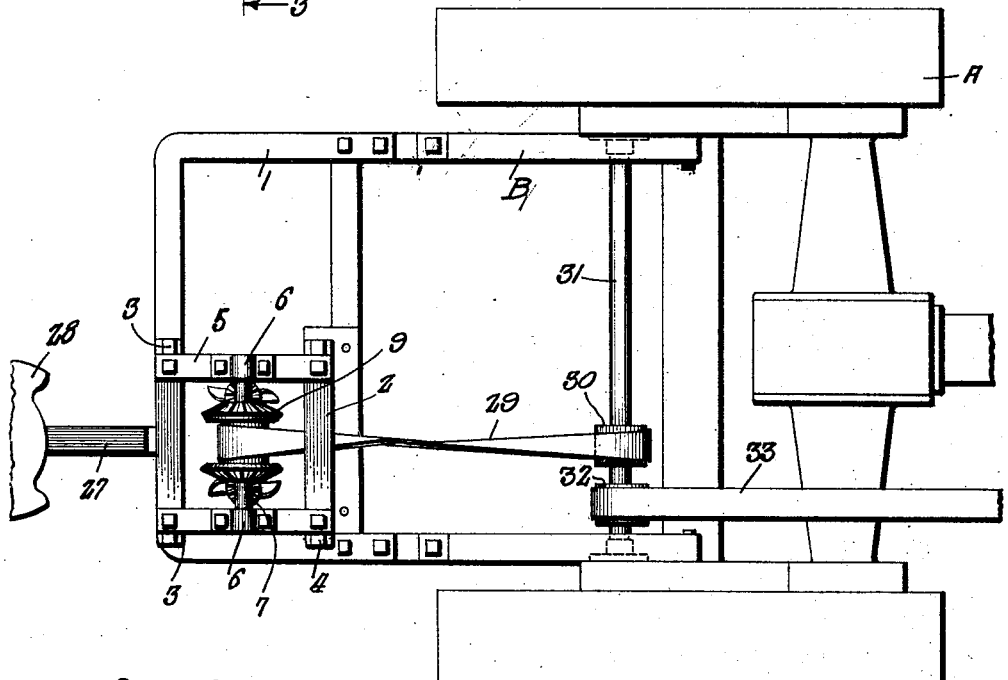
Figure 2 is a top plan view.

Referring to the drawings in detail, the letter A indicates a tractor which of course may be of any type but is shown as including a draw bar B which has fixed thereto and extending rearwardly therefrom an auxiliary draw bar 1 that is substantially U-shape in formation as best shown in Figure 2.

The cross members of the draw bars B and 1 provide supporting means for the frame of my invention, and this frame includes side pieces 2 having ears 3 formed at the lower ends thereof for the purpose of accommodating bolt and nut connections 4 to secure the frame with respect to the draw bars.

It will be noted that the frame is disposed laterally upon the draw bars as shown in Figure 2, and by this arrangement, it will be apparent that another frame may be secured in parallelism therewith if desired. In fact, any number of my devices may be associated with a tractor to be driven by the latter, without departing from the spirit of the invention.

The side pieces 2 are provided at their upper ends with inwardly turned confronting flanges 5 that have secured thereto and centrally thereof bearing blocks 6 within which are journaled the ends of a shaft 7, the bearing blocks including straps having oil receiving openings therein, whereby the shaft may be properly lubricated. The shaft has formed centrally thereof a pulley 8 which has formed with its outer ends bevel gears 9.

Transversing the side pieces is a cross member 10 having secured thereto bearing blocks 11 within which are journaled stub shafts 12, the latter having formed with their upper ends pinions 13, which mesh with the bevel gears 9.

The lower portions of the stub shafts 12 are reduced to provide shoulders at the upper portions thereof, and these shoulders are received by the bearing blocks 11 as shown. The lower ends of the stub shafts are forked to provide portions of universal joints 14, while the remaining portions of said joints are provided on intermediate shafts 15 that extend into cylinders 16 which are provided with slots formed vertically therein and diametrically opposed with respect to each other for the purpose of receiving lugs 17 formed upon opposite sides of heads 18, the latter being secured to the lower ends of the intermediate shafts 15. Threadedly secured to the upper and lower ends of the cylinders are cap members 19, and the upper cap members are slidably mounted on the intermediate shafts, but in order to normally hold the cylinders in the position as shown in Figure 3, I employ coil springs 20 that surround the intermediate shafts and have their end convolutions bearing against the upper cap members and the heads 18.

Formed with the upper ends of shanks 21 are heads 22 which are received in the lower cap members, and the lower ends of these shanks 21 have secured thereto in any well known manner and for detachment therefrom if desired, ground penetrating members 23 in the form of propellers and which act in the nature of hoes for breaking up the soil as well as chopping and weeding the growth of vegetation as will be apparent. These ground penetrating members 23 each include a pair of oppositely disposed blades that are curved upon themselves, and are provided with a flat blade edge 24. The blade of the ground penetrating members incline upwardly from the edge thereof and the rear edges of the blades are reinforced by beads. By this construction, it will be apparent that the blade edge will chop, and remove vegetation and the like from the soil and due to the inclined blade portions, these members will pick up the soil and throw the same and vegetation between the rows instead of leaving the same in the middle thereof as is customarily done with implements of this character now in general use.

Secured to the shanks 21 are collars 25 and supported by these collars 25 are sleeves 26 which act in the form of hand grips whereby the operator of the ground penetrating members can grasp the same for movement in accordance with his desires, as it will be apparent that the ground penetrating members can be disposed laterally, forwardly, rearwardly and vertically, due to the universal joints 14 and the sliding connection of the cylinders with respect to the intermediate shafts.

Secured to the draw bar 1 and extending rearwardly therefrom is the supporting member 27 of the operator's seat 28 and by this arrangement, the operator of the ground penetrating members will be conveniently seated whereby the members can be easily and expeditiously operated with respect to the rows and in a manner as above set forth.

The ground penetrating members are driven through the instrumentality of the pulley 8 that has trained thereabout a belt 29, the latter being also trained about a pulley 30 secured to a shaft 31 that is provided with a further pulley 32 having trained thereabout a belt 33 which is likewise trained about the power pulley of the tractor A.

The frame is reinforced by vertically arranged bars 34 that are provided with heads at their lower ends and the upper ends may have threadedly secured thereto nuts, or if desired, the rods may be permanently fixed so as to insure a rigid construction as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An agricultural machine comprising a frame, means for securing the frame to a propelling means, ground penetrating members having means for rotating the same from the propelling means and carried by said frame, means to allow for vertical movement of said ground penetrating means, shanks for said ground penetrating means, universal joints having connection with said shanks to allow for lateral, rearward and forward movement of said ground penetrating means, and means for manually moving the ground penetrating means through the medium of the shanks and carried by the latter.

2. An agricultural machine comprising a frame, means for securing the frame to a propelling means, ground penetrating means mounted for rotation and carried by the frame, means for rotating the ground penetrating means from the propelling means, means to allow for vertical, forward, rearward and lateral movement of the ground penetrating means, and hand gripping means below the means for allowing the vertical, forward, rearward and lateral movement of the ground penetrating means for manually moving the latter with respect to a row of crop.

3. A vegetation chopper comprising a frame having connection with a tractor, side pieces included in said frame, a shaft journaled on said side pieces, a pulley formed with said shaft, bevel gears formed with said pulley, stub shafts journaled in said frame, pinions for said stub shafts and meshing with the bevel gears, intermediate shafts, universal joints connecting the intermediate shafts to the stub shafts, shanks having connection with the universal joints, coil spring included in the last mentioned connection, and surrounding the intermediate shafts, collars secured to said shanks, and gripping sleeves supported by said collars and surrounding said shanks, means for allowing vertical movement of said shanks against the tension of the coil springs, and ground penetrating members secured to the lower ends of said shanks.

4. A vegetation chopper comprising a frame including side pieces having connection with a tractor, a shaft journaled on the side pieces, a cross member transversely arranged in said frame and secured to said side pieces, stub shafts journaled on said cross member, pinions secured to said stub shafts, bevel gears secured to the shaft first mentioned and meshing with the pinions, means for rotating the shaft first mentioned from the tractor, intermediate shafts, universal joints between the intermediate shafts and stub shafts, cylinders surrounding the intermediate shafts and being provided with diametrically oppositely disposed vertically arranged slots, heads secured to the intermediate shafts, lugs formed with said heads and movable in said slots, caps for said cylinders, coil springs between the heads and upper caps of said cylinders, shanks, heads formed with said shanks and arranged with said cylinders, ground penetrating members secured to the lower ends of said shanks, and means for controlling the ground penetrating members with respect to rows of growing crops.

JAMES K. MILLEN.